United States Patent [19]
Yamada et al.

[11] Patent Number: 5,835,673
[45] Date of Patent: Nov. 10, 1998

[54] DIGITAL SIGNAL RECORDING ON A MAGNETIC RECORDING MEDIUM HAVING A NON-MAGNETIC BASE AND MAGNETIC METAL FILM OF CERTAIN CHARACTERISTICS

[75] Inventors: Yukari Yamada; Mayumi Abe; Kazunobu Chiba; Yuichi Arisaka; Kenichi Sato, all of Miyagi, Japan

[73] Assignee: Sony Corporation, Tokyo, Japan

[21] Appl. No.: 877,536

[22] Filed: Jun. 17, 1997

Related U.S. Application Data

[60] Continuation of Ser. No. 440,775, May 15, 1995, abandoned, which is a division of Ser. No. 371,480, Jan. 11, 1995, abandoned, which is a continuation of Ser. No. 848,221, Mar. 9, 1992, abandoned.

[30]    Foreign Application Priority Data

Mar. 15, 1991  [JP]  Japan ................... 3-076770
Jun. 25, 1991  [JP]  Japan ................... 3-153440
Jan. 31, 1992  [JP]  Japan ................... 4-017147

[51] Int. Cl.⁶ ............................ H04N 5/917; H04N 5/781
[52] U.S. Cl. ................................. 386/112; 386/125
[58] Field of Search ..................... 386/125, 126, 386/124, 112, 109, 111, 46; 360/32; 369/275.1, 275.3, 275.5; H04N 5/917, 5/781

[56]    References Cited

U.S. PATENT DOCUMENTS 5,191,436   3/1993  Yonemitsu ........................... 386/52
5,218,599   6/1993  Tsuyoshi et al. ................... 369/275.1
5,262,877  11/1993  Otsuka .................................. 386/126
5,745,641   4/1998  De Haan et al. .................... 386/95

Primary Examiner—Robert Chevalier
Attorney, Agent, or Firm—Frommer Lawrence & Haug LLP; William S. Frommer

[57]    ABSTRACT

A method for magnetically recording digital video signals includes the steps of: converting input digital video signals into data segmented into blocks each composed of a plurality of pixel data; compression-coding the blocks of pixel data block-by-block; converting the compression-coded data into channel-encoded data; and supplying the channel-encoded data to magnetic heads on a rotary drum for recording by such heads on a magnetic recording medium constituted by a nonmagnetic base having thereon a magnetic layer of at least one thin magnetic metal film which has an energy product of at least 75 G.cm.Oe, with the surface roughness of said magnetic recording medium being at most 0.003 μm in center line average height Ra, and with the surface roughness of said magnetic recording medium being at most 0.04 μm in ten point average height Rz.

7 Claims, 12 Drawing Sheets

FIG. 6
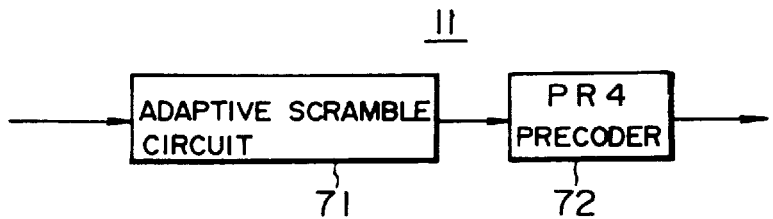
FIG. 7
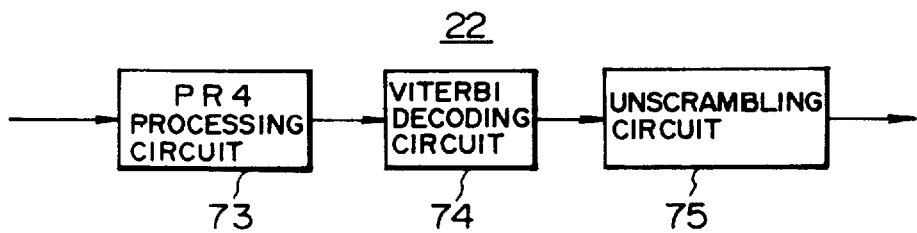
FIG. 8A      FIG. 8B
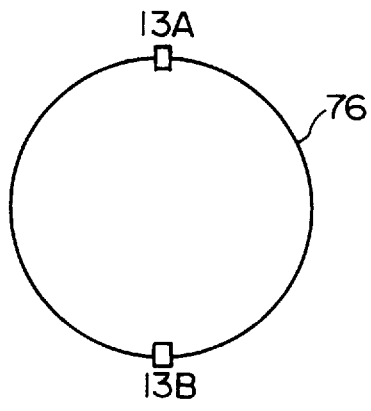  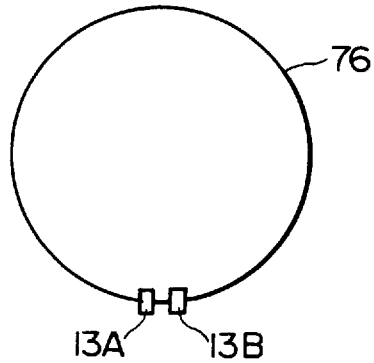

FIG. IIA
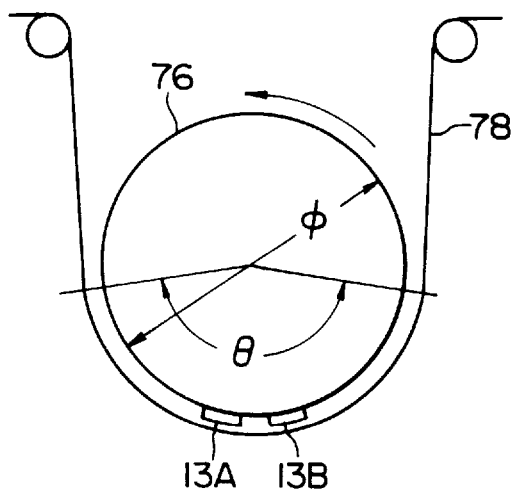
FIG. IIB
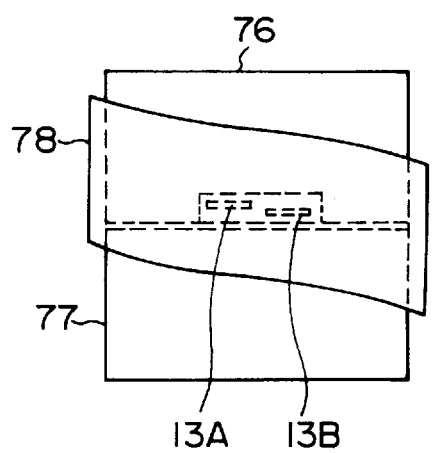
FIG. 12A
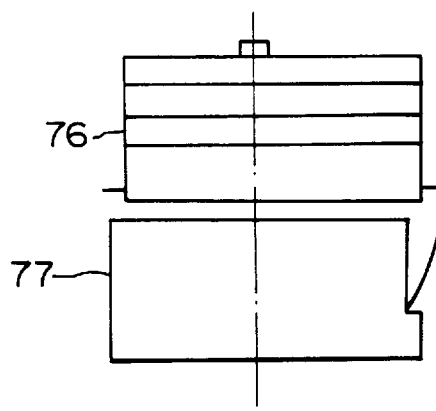
FIG. 12B
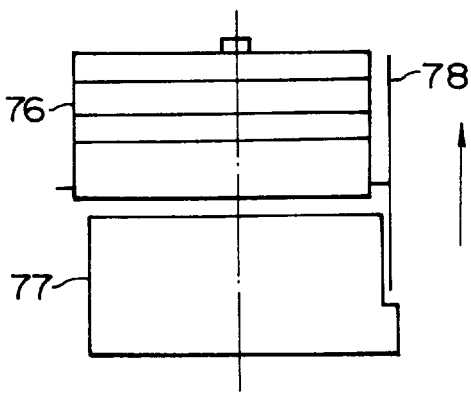

DIGITAL SIGNAL RECORDING ON A MAGNETIC RECORDING MEDIUM HAVING A NON-MAGNETIC BASE AND MAGNETIC METAL FILM OF CERTAIN CHARACTERISTICS

This application is a continuation of application Ser. No. 08/440,775, filed on May 15, 1995, now abandoned and which is a divisional of Ser. No. 08/371,480 filed on Jan. 11, 1995, which is now abandoned and which is a continuation of Ser. No. 07/848,221 filed on Mar. 9, 1992 and which is abandoned.

BACKGROUND OF THE INVENTION

1. Field of the Invention

The present invention relates to a method of magnetically recording digital video signals by a digital VTR for recording digital video signals on a magnetic tape and, more particularly, to improvements in a magnetic recording medium employed in recording compressed digital video signals without entailing reproduction distortion.

2. Description of the Prior Art

Component digital VTRs of the D1 format and composite digital VTRs of the D2 format, which are intended for use by broadcasting stations, digitize color video signals into digital color video signals and record the color digital video signals on a recording medium, such as a magnetic tape.

The digital VTR of the D1 format converts luminance signals, and first and second color difference signals for A/D conversion at sampling frequencies of 13.5 MHz and 6.75 MHz, respectively, processes the digital signals fore predetermined signal processing and records the processed digital signals on a magnetic tape. Since the ratio of sampling frequencies for sampling the components of the signals is 4:2:2, the digital VTR of the D1 format is designated also as a digital VTR of the 4:2:2 system.

The digital VTR of the D2 format samples composite color video signals at a sampling frequency four times the frequency of a color subcarrier signal for A/D conversion, processes the digital signals for predetermined signal processing and records the processed digital signals on a magnetic tape.

Since both the digital VTR of the D1 format and the digital VTR of the D2 format are designed for use by broadcasting stations, priority is given to picture quality in designing these digital VTRs. These digital VTRs record 8-bit digital color video signals obtained by the A/D conversion of samples substantially without compression.

The data bit rate of the digital VTR of the D1 format will be described by way of example. If a color video signal is sampled at the foregoing sampling frequencies with 8-bit digital signals provided by A/D conversion, the data bit rate is about 216 Mbps (megabits per second). When data during horizontal and vertical blanking intervals is excluded, the number of effective picture elements of luminance signals and the number of effective picture elements of each color difference signal in each horizontal scanning interval are 720 and 360, respectively. Accordingly, the video signal data bit rate Dv is:

$$Dv = (720 + 360 + 360) \times 8 \times 250 \times 60 = 172.8 \text{ Mbps}$$

In the PAL system (625/50), the number of effective scanning lines for each field is 300 and the number of fields per second is 50. Therefore, the data bit rate of the PAL system is equal to that of the NTSC system. Including redundant components for error correction and formatting, the video data bit rate is about 205.8 Mbps in total.

Since the audio data bit rate Da is about 12.8 Mbps and additional data bit rate Do for editing gaps, preambles and postables is about 6.6 Mbps, the total recording data bit rate Dt of the NTSC system is:

$$Dt = Dv + Da + Do = 172.8 + 12.8 + 6.6 = 192.2 \text{ Mbps}$$

To record data at such a data bit rate, the digital VTR of the D1 format employs a segment system using ten tracks per field for the NTSC system and twelve tracks per field for the PAL system, and uses either magnetic tapes of 19 mm in width and 13 $\mu$m in thickness or magnetic tapes of 19 mm in width and 16 $\mu$m in thickness contained in an L-size cassette, an M-size cassette or an S-size cassette. The data is recorded on such magnetic tapes in a recording density on the order of 20.4 $\mu m^2$/bit.

From these conditions, the respective reproducing times of those tape cassettes for the digital VTR of the D1 format are thirteen minutes for S-size cassettes, forty-two minutes for M-size cassettes and ninety-four minutes for L-size cassettes when the thickness of the magnetic tapes is 13 $\mu$m, and eleven minutes for S-size cassettes, thirty-four minutes for M-size cassettes and seventy-six minutes for L-size cassettes when the thickness of the magnetic tapes is 16 $\mu$m.

Thus, the digital VTR of the D1 format is sufficiently effective for use by broadcasting stations placing priority to picture quality. However, the reproducing time of the digital VTR of the D1 format is only on the order of one and half hours at most even if a large cassette containing a magnetic tape of 19 mm in width is used and the digital VTR of the D1 format is therefore unsuitable for domestic use.

On the other hand, signals can be recorded in a recording density of 1.25 $\mu m^2$/bit if signals having the shortest wavelength of 0.5 $\mu$m are recorded on tracks of 5 $\mu$m in width and, if the signals can be compressed without entailing reproduction distortion, an extended reproducing operation is possible even if the magnetic tape has a width of 8 mm or less.

However, the bit error rate increases greatly in reproducing recorded signals if signals are recorded in such a high recording density of 1.25 $\mu m^2$/bit on a magnetic tape having the same surface design and magnetic characteristics as those of magnetic tapes for VTRs of the conventional low-frequency conversion system. For example, the surface of a ME (metal evaporation) tape has two kinds of protrusions of different heights formed by a filler added to the base film for supporting a magnetic layer, and an organic material, such as an emulsion of a polymer, or an inorganic material, such as $SiO_2$, forming an under layer over the surface of the base film. If the difference in height between the large protrusions formed by the filler added to the base film and the small projections formed by the under layer is excessively large, portions of the magnetic head having a low abrasion resistance, such as portions formed of glass or Sendust, are abraded by the sliding magnetic tape to cause spacing loss and, consequently, the level of reproducing output falls greatly entailing increase in the bit error rate.

Since color characteristics in the long-wavelength region are important for a VTR of the low-frequency conversion system, residual magnetic flux density Br and energy product Br.$\delta$.Hc (G.cm.Oe), where $\delta$ is the thickness of the magnetic layer and Hc is the coercive force, are determined accordingly. On the other hand, color characteristics in a long-wavelength region is not very important for a digital VTR for recording digital video signals and hence priority is given to color characteristics in the short-wavelength region in designing a magnetic tape.

In a digital VTR, which compresses digital video signals and records the compressed digital video signals without entailing reproduction distortion, it is essential that the CN (carrier to noise) ratio be high and the bit error rate be low in the short-wavelength region. As mentioned above, a digital VTR for recording digital video signals, particularly, a digital VTR which compresses digital video signals and records the compressed digital video signals without entailing reproduction distortion, requires a magnetic recording medium designed particularly for such a digital video signal recording mode.

SUMMARY OF THE INVENTION

The present invention has been made in view of the foregoing problems and it is therefore an object of the present invention to provide a magnetic recording medium, and a method of recording magnetic digital video signals employing the magnetic recording medium, capable of reducing the bit error rate before error correction to $1 \times 10^{-4}$ or less.

Another object of the present invention is to provide a magnetic recording medium, and a method of recording magnetic digital video signals capable of minimizing the reduction of the output level upon reproduction and of improving electromagnetic conversion characteristics.

A magnetic digital video signal recording method according to a first aspect of the present invention comprises separating input digital video signals into data blocks each comprising a plurality of picture element data; compression-coding the data of each data block; channel-coding the compression-coded data; and recording the channel-coded data on a magnetic recording medium with a magnetic head mounted on a rotary drum; wherein the magnetic recording medium has a magnetic metal thin film formed as a magnetic layer on a nonmagnetic substrate, and the magnetic layer has an energy product, i.e., the product of remanent magnetic flux density, thickness and coercive force of the magnetic layer, of 75 G.cm.Oe or above, a center line average Ra of at most 30 Å and a tenpoint average height Rz of at most 400 Å.

A magnetic digital video signal recording method according to a second aspect of the present invention comprises separating input digital video signals into data blocks each comprising a plurality of picture element data; compression-coding the data of each data block; channel-coding the compression-coded data; and recording the channel-coded data on a magnetic recording medium with a magnetic head mounted on a rotary drum; wherein the magnetic recording medium has a magnetic metal thin film formed as a magnetic layer on a nonmagnetic substrate, the magnetic layer has an energy product, i.e., the product of residual magnetic flux density, thickness and coercive force of the magnetic layer, of 75 G.cm.Oe or above, the height $h_f$ of protrusions formed on the surface of the magnetic recording medium by a filler added to the nonmagnetic substrate is at most 400 Å and the height $h_u$ of protrusions formed on the surface of the magnetic layer by an under layer underlying the magnetic layer is at most 200 Å. Preferably, $h_f - h_u \leq 300$ Å, more preferably, $h_f - h_u \leq 200$ Å.

A magnetic digital video signal recording method according to a third aspect of the present invention comprises separating input digital video signals into data blocks each comprising a plurality of picture element data; compression-coding the data of each data block; channel-coding the compression-coded data; and recording the channel-coded data on a magnetic recording medium with a magnetic head mounted on a rotary drum; wherein the magnetic recording medium has a magnetic metal thin film formed as a magnetic layer on a nonmagnetic substrate, and the magnetic layer has an energy product, i.e., the product of remanent magnetic flux density, thickness and coercive force, of 75 G.cm.Oe or above and a coercivity squareness S* of 0.3 or above.

The surface design of a magnetic tape for use on a digital VTR which compresses and records digital video signals without causing distortion during reproduction must be different from the surface design of a magnetic tape for conventional VTRs. When the surface of the magnetic layer of a magnetic tape for use on a digital VTR has a center line average height Ra of 30 Å or below and a ten-point average height Rz of 400 Å or below the bit error rate before correction is as low as $1 \times 10^{-4}$ or less even if recording density is increased to a value on the order of 1 $\mu m^2$/bit.

Similarly, when the height $h_f$ of protrusions formed on the surface of the magnetic recording medium by the filler added to the nonmagnetic substrate of the magnetic recording medium is 400 Å or below, and the height $h_u$ of protrusions formed on the surface of the magnetic recording medium by the under layer underlying the magnetic layer is 200 Å or below, the local abrasion of the magnetic head and spacing loss are suppressed, the reduction of the output level upon reproduction is minimized, and electromagnetic conversion characteristics are improved.

If the magnetic recording medium is provided with a magnetic metal thin film formed with a large thickness at a fixed deposition rate as the magnetic layer on the nonmagnetic substrate, noise increases due to increase in output and magnetic deterioration attributable to increase in the thickness of the magnetic metal thin film. Conditions for enabling the digital VTR to secure electromagnetic conversion characteristics of a high CN ratio are expressed by:

$$Br.\delta.Hc \geq 75 \text{ G.cm.Oe}$$

$$S^* \geq 0.3$$

where Br is the remanent magnetic flux density of the magnetic metal thin film, $\delta$ is the thickness of the magnetic metal thin film, Hc is coercive force of the magnetic metal thin film and S* is the coercivity squareness of the magnetic metal thin film.

BRIEF DESCRIPTION OF THE DRAWINGS

The above and other objects, features and advantages of the present invention will become more apparent from the following description taken in connection with the accompanying drawings, in which:

FIG. 6 is a block diagram of a channel encoder;

FIG. 7 is a block diagram of a channel decoder;

FIGS. 8A and 8B are typical views that illustrate the disposition of a magnetic head;

FIGS. 11A and 11B are a plan view and a side view, respectively, of a tape head system;

FIGS. 12A and 12B are typical views that illustrate the vibration of a magnetic tape due to the eccentricity of a rotary drum;

DETAILED DESCRIPTION OF THE PREFERRED EMBODIMENTS

A magnetic digital video signal recording method in a first embodiment according to the present invention records signals of the shortest wavelength of 0.5 $\mu$m on tracks of 5 $\mu$m in track width in a recording density of 1.25 $\mu m^2$/bit by a digital VTR capable of compressing recording data without entailing significant distortion during reproduction and of operating for an extended recording and reproducing operation even if the magnetic tape is a narrow one having a width of 8 mm or below. Prior to the description of the magnetic digital video signal recording method, the construction of the digital VTR will be described.

Construction of the Digital VTR

Signal Processing Unit

Figure 1:
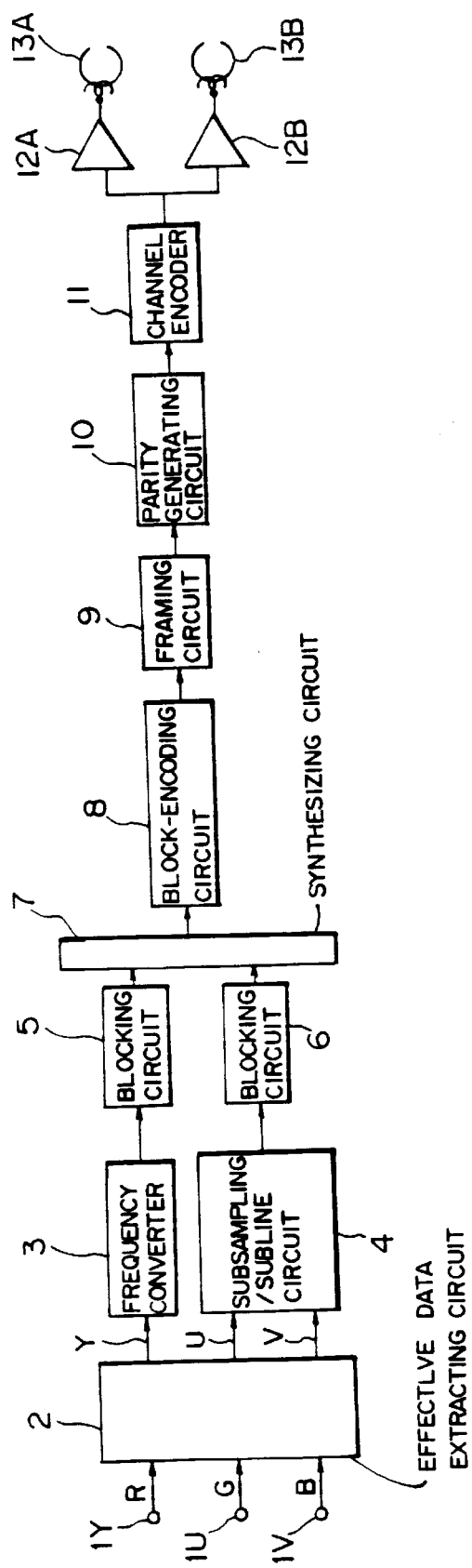
FIG. 1 is a block diagram of the recording circuit of the signal processing unit of a digital VTR which compresses and records digital video signals without causing distortion during reproduction.

Referring to FIG. 1, digital luminance signals Y and digital color difference signals U and V extracted from three color signals R, G and B produced by, for example, a color video camera, are applied respectively to input terminals 1Y, 1U and 1V. The clock rates of the signals Y, U and V are equal to the frequencies of the component signals of a D1 format. Sampling frequencies are 13.5 MHz and 6.75 MHz, and each sample is represented by eight bits. Therefore, the bit data rate of the signals applied to the input terminals 1Y, 1U and 1V is about 216 Mbps. The bit rate of data of the signals if compressed to about 167 Mbps by removing data in blanking intervals among those of the signals and extracting only the data in effective regions by effective data extracting circuit 2.

The luminance signals Y among the output signals of the effective data extracting circuit 2 are given to a frequency converter 3. The frequency converter 3 converts the sampling frequency of 13.5 MHz into a frequency equal to ¾ of 13.5 MHz. The frequency converter 3 employs, for example, a thinning filter to prevent convolutional distortion. The output signal of the frequency converter 3 is given to a blocking circuit 5. The blocking circuit 5 converts the sequence of luminance data into block sequence. A blocking encoding circuit 8 is connected to the blocking circuit 5.

Figure 3:
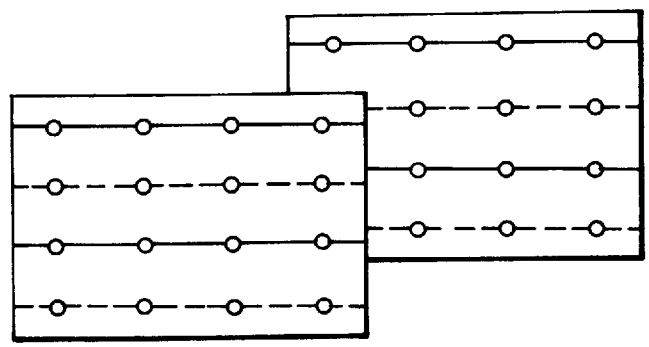
FIG. 3 is a diagrammatic view of blocks for block coding.
Figure 4:
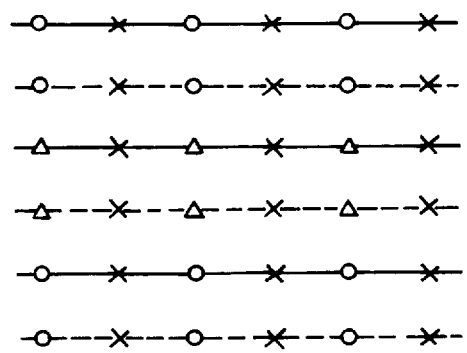
FIG. 4 is a diagrammatic view that illustrates operation of a subsampling/subline circuit.

Referring to FIG. 3 showing the structure of a three-dimensional block to be coded, a plurality of 4-line×4-picture-element ×2-frame blocks are formed by dividing a screen spreading over, for example, two frames. In FIG. 3, lines of odd fields are represented by continuous lines, and lines of even fields are represented by broken lines. Two color difference signals U and V among the output signals of the effective data extracting circuit 2 are given to a subsampling/subline circuit 4. The subsampling/subline circuit 4 changes the sampling frequency of 6.75 MHz into a sampling frequency of ½ of 6.75 MHz. The two digital color difference signals are selected by lines and data of one channel is produced. The subsampling/subline circuit 4 provides digital signals in line sequence. FIG. 4 shows the dot construction of the signals processed by the subsampling/subline circuit 4, in which blank circles represent subsampling dots of the first color difference signal U, blank triangles represent subsampling dots of the second color difference signal V, and crosses represent dots removed by subsampling.

The line sequence output signals of the subsampling/subline circuit 4 are given to a blocking circuit-6. The blocking circuit 6, similarly to the blocking circuit 5, converts the color difference data of the scanning sequence which is in television signals into data in block sequence. The blocking circuit 6 converts the color difference data into a 4-line×4-dot ×2-frame structure. The output signals of the blocking circuits 5 and 6 are given to a synthesizing circuit 7.

The synthesizing circuit 7 converts the luminance signals of block sequence and color difference signals into data of one channel and gives the same to a block coding circuit 8. The block coding circuit 8 is a coding circuit suitable for the dynamic range of each block (hereinafter referred to as "ADRC") or a discrete cosine transform circuit (hereinafter referred to as "DCT circuit"). The output signal of the block coding circuit 8 is given to a framing circuit 9. The framing circuit 9 converts the input signals into a frame structure. In the framing circuit 9, the clock rate of the data is changed from that of the picture element system to that of the recording system.

The output signal of the framing circuit 9 is given to a parity generating circuit 10 for generating a parity for an error correction code. The output signal of the parity generating circuit 10 is given to a channel encoder 11 for channel coding to decrease the low region of recording data. The output signals of the channel encoder 11 is applied through recording amplifiers 12A and 12B and a rotary transformer, not shown, to a pair of magnetic heads 13A and 13B to record the output signal of the channel encoder 11 on a magnetic tape. Video signals and audio signals are compressed and coded separately and given to the channel encoder 11.

The foregoing signal processing procedure extracts only the data in the effective scanning period among the input data of 216 Mbps to provide recording data of 31.56 Mbps.

Figure 2:
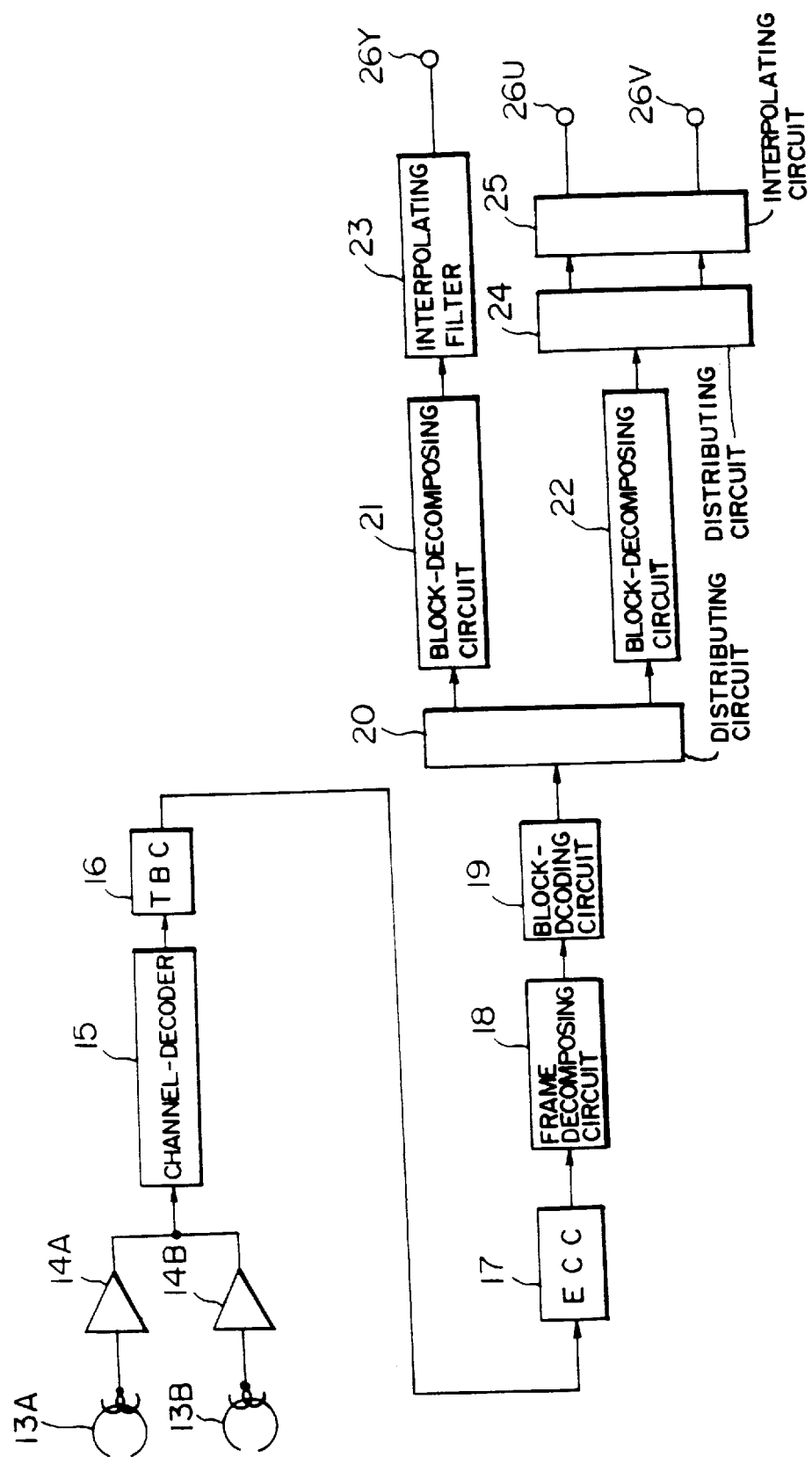
FIG. 2 is a block diagram of the reproducing circuit of the signal processing unit.

Referring to FIG. 2 showing the reproducing circuit of the signal processing unit, reproduced data read by the magnetic heads 13A and 13B are transmitted through a rotary transformer and reproducing amplifiers 14A and 14B to a channel decoder 15. The channel decoder channel-decodes the reproduced data. The output signal of the channel decoder 15 is given to a TBC (time base corrector) 16. The TBC 16 removes time base errors from the reproduced data, and gives the reproduced data to an ECC 17 for error detection and error correction using error correction code. The output signal of the ECC 17 is given to a frame decomposing circuit 18.

The frame decomposing circuit 18 separates the components of the block-coded data and changes the clock rate of the data from that of the recording system to that of the picture element system. The data decomposed by the frame decomposing circuit is given to a block-decoding circuit 19. The block-decoding circuit 19 decodes recovered data corresponding to original data for each block, and gives decoded data to a distributing circuit 20. The distributing circuit 20 decomposes the decoded data into luminance signals and color difference signals, and gives the luminance signals and the color difference signals respectively to block decomposing circuits 21 and 22. The block decomposing circuits 21 and 22 convert the decoded data from block sequence into raster scanning sequence. The function of the block decomposing circuits 21 and 22 is reverse to that of the blocking circuits 5 and 6 of the recording circuit.

A decoded luminance signal provided by the block decomposing circuit 21 is given to an interpolating filter 23. The interpolating filter 23 changes the sampling rate of the luminance signal from 3 fs to 4 fs (=13.5 MHz), and supplies a digital luminance signal Y to an output terminal 26Y.

The block decomposing circuit 22 gives the digital color difference signals to a distributing circuit 24. The distributing circuit 24 sorts the line sequence digital color difference signals U and V into digital color difference signals U and V and gives the same to an interpolating circuit 25 for interpolation. The interpolating circuit 25 interpolates the data of the extracted lines and picture elements by using the recovered picture element data and gives digital color difference signals U and V of a sampling rate of 2 fs to output terminals 26U and 26V.

Block-Coding Circuit

A block-coding circuit 8 shown in FIG. 1 is an ADRC circuit (adaptive dynamic range coding circuit) which determines the maximum MAX and the minimum MIN of the plurality of picture element data included in each block, determines the dynamic range DR of the block, and carries out a coding operation according to the dynamic, range DR for requantization using a number of bits smaller than the number of bits of the original picture element data. Alternatively, block coding circuit 8 may be such a circuit that converts the picture element data of each block by DCT (discrete coding transform) into coefficient data, quantizes the coefficient data obtained by DCT, and subjects the quantized data to Huffman run length coding for compression-coding.

An ADRC circuit which does not reduce picture quality even if signals are recorded in a multidubbing mode will be described with reference to FIG. 5.

Figure 5:
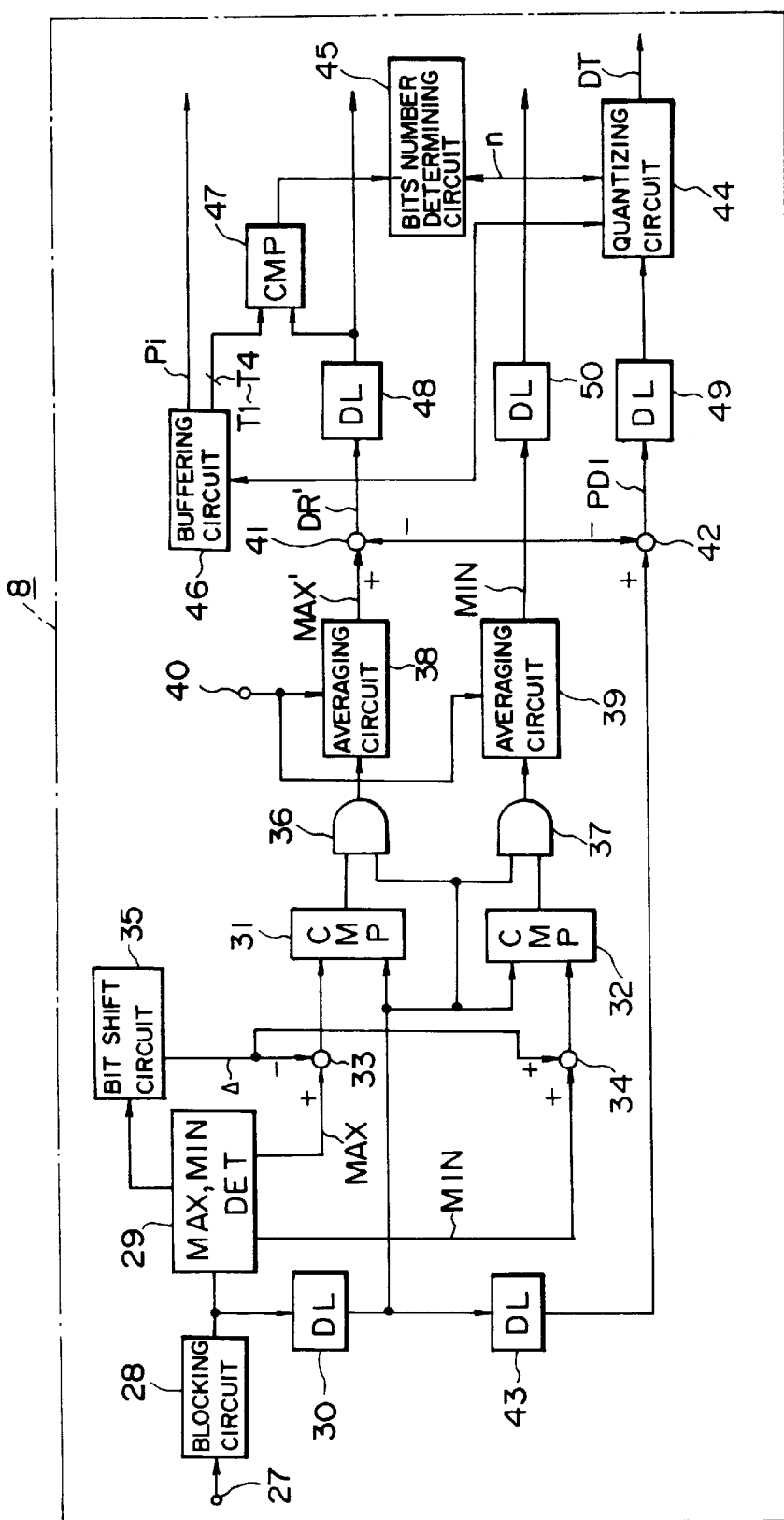
FIG. 5 is a block diagram of a block coding circuit.

Referring to FIG. 5, the synthesizing circuit 7 (FIG. 1) applies a digital video signal (or digital color difference signal) quantized by eight bits for each sample through an input terminal 27 to a blocking circuit 28. The blocking circuit 28 gives blocked data to a maximum/minimum detecting circuit 29 and a delay circuit 30. The maximum/minimum detecting circuit 29 detects the maximum MAX and the minimum MIN in each block. The delay circuit 30 delays receiving input data for a time required for detecting the maximum MAX and the minimum MIN. The delay circuit 30 gives picture element data to comparators 31 and 32.

The maximum MAX and the minimum MIN detected by the maximum/minimum detecting circuit 29 are given respectively to a subtracter 33 and an adder 34. A bit shift circuit 35 applies a quantizing step width $\Delta$ of 1/16 DR for nonedgematching quantization of 4-bit fixed length to the subtracter 33 and the adder 34. The bit shift circuit 35 shifts the dynamic range DR by four bits for division by 16. The subtracter 33 provides a threshold of (MAX−$\Delta$) and the adder provides a threshold of (MIN+$\Delta$). The thresholds provided by the subtracter 33 and the adder 34 are given to the comparators 31 and 32, respectively. The quantizing step width $\Delta$ may be substituted by a fixed value corresponding to a noise level.

The output signal of the comparator 31 is applied to an AND gate 36 and the output signal of the comparator 32 is applied to an AND gate 37. The delay circuit 30 applies the input data to the AND gates 36 and 37. The output signal of the comparator 31 is HIGH when the input data is greater than the threshold. Accordingly, picture element data within a maximum level range of MAX to (MAX−$\Delta$) among the input data appears at the output terminal of the AND gate 36. The output signal of the comparator 32 is LOW when the input data is smaller than the threshold. Accordingly, the picture element data in a minimum level range of MIN to (MIN+$\Delta$) among the input data appear at the output terminal of the AND gate 37.

The output signal of the AND gate 36 is given to an averaging circuit 38 and the output signal of the AND gate 37 is given to an averaging circuit 39. The averaging circuits 38 and 39 calculate the respective averages of the blocks. A blocking period reset signal is applied through a terminal 40 to the averaging circuits 38 and 39. The averaging circuit 38 provides the average MAX' of the picture element data in the maximum level range of MAX to (MAX−$\Delta$). The averaging circuit 39 provides the average MIN' of the picture element data in the minimum level range of MIN to (MIN+$\Delta$). A subtracter 41 subtracts the average MIN' from the average MAX' to provide a dynamic range DR'.

A subtracter 42 subtracts the average MIN' from the input data given thereto through the delay circuit 43 to eliminate the minimum value from the input data and provides data PD1. The data PD1 and the corrected dynamic range DR' are given to a quantizing circuit 44. The quantizing circuit 44 employed in this embodiment is a variable-length ADRC for edge-matching quantization, in which the number of bits allocated for quantization is 0 (code signal is not transferred), 1, 2, 3 or 4. The number n of bits to be allocated to a block is determined for each block by bit number determining circuit 45 and the number n of allocated bits is given to the quantizing circuit 44.

The variable-length ADRC allocates smaller numbers of bits to blocks of smaller dynamic ranges DR' and allocates larger numbers of bits to blocks of larger dynamic ranges DR' for efficient coding. No code signal is transferred to and only data of a dynamic range DR' is transferred to blocks having a dynamic range DR' meeting: DR'<T1, n=1 for blocks of a dynamic range RD' meeting: T1$\leq$DR'<T2, n=2 for blocks of a dynamic range DR' meeting: T2$\leq$DR'<T3, n=3 for blocks of a dynamic range DR' meeting: T3$\leq$DR'<T4, and n=4 for blocks of a dynamic range DR' meeting: DR'$\geq$T4, where T1 to T4 are thresholds for determining the number n of bits to be allocated to blocks.

The variable-length ADRC is capable of controlling, namely, buffering, the quantity of data to be produced by varying the thresholds T1 to T4. Accordingly, the variable-length ADRC can be applied to a transfer circuit, such as the VTR employed in this embodiment, in which the quantity of data for each field or each frame must be limited to a predetermined value. A buffering circuit 46 for determining the thresholds T1 to T4 for limiting the quantity of data produced to a predetermined value stores a plurality of threshold sets (T1, T2, T3, T4), for example, thirty-two sets, identified by parametric codes Pi (i=0, 1, 2, . . . , and 31). The quantity of data to be produced decreases as the subscript "i"

of the parametric code Pi increases. The picture quality of the recovered picture deteriorates with the decrease of the quantity of data to be produced.

A comparator 47 receives the thresholds T1 to T4 from the buffering circuit 46 and receives the dynamic range DR' from the subtracter 41 through a delay circuit 48. The delay circuit 48 delays the application of the dynamic range DR' to the comparator 47 for a time required for the buffering circuit 46 to determine a set of thresholds. The comparator 47 compares the dynamic range DR' of each block and the thresholds. The output signal of the comparator 47 is given to the bit number determining circuit 45 to determine the number n of bits to be allocated to the block. The quantizing circuit 44 converts the data PD1 given thereto through a delay circuit 49 into a code signal DT by edge-matching quantization using the dynamic range DR' and the number n of the allocated bits. The quantizing circuit 44 is, for example, a ROM.

The modified dynamic range DR' and the average MIN' are provided respectively through the delay circuit 48 and a delay circuit 50, the parametric code Pi indicating a threshold set is provided by the buffering circuit 46 and the code signal DT is provided by the quantizing circuit 44. Since signals quantized by nonedge-matching quantization are quantized by edge-matching quantization on the basis of the dynamic range data, the picture quality of the picture is scarcely deteriorated by dubbing.

CHANNEL ENCODER AND CHANNEL DECODER

The channel encoder 11 and the channel decoder 15 shown in FIG. 1 will be described hereinafter.

Referring to FIG. 6, the channel encoder 11 is provided with an adaptive scramble circuit 51 having a plurality of M-systems. The output signal of the parity generating circuit 10 is given to the adaptive scramble circuit 51. An M-system that provides an output signal having the least high-frequency component and the least dc component among the M-systems is selected. A precoder 52 of a partial response class 4 detecting system executes the calculation of $1/(1-D^2)$ (D is a circuit for unit delay). The output signals of the precoder 52 are amplified by the amplifiers 12A and 13A, and the amplified signals are recorded by the magnetic heads 13A and 13B. In reproducing the signals, reproduced signals are amplified by the amplifiers 14A and 14B.

Referring to FIG. 7, the channel decoder 15 is provided with a partial response class 4 processing circuit 53 for processing the output signals of the amplifiers 14A and 14B for the calculation of 1+D, a so-called Viterbi decoding circuit 54, which is resistant to noise, decodes the output signals of the processing circuit 53 by using the correlation and certainty of data, and an unscrambling circuit 55 for unscrambling the data scrambled by the recording circuit to recover the original data. Block decoding by the Viterbi decoding circuit 54, as compared with bit decoding, improves the CN ratio by 3 dB.

ELECTROMAGNETIC CONVERSION SYSTEM

Figure 9:
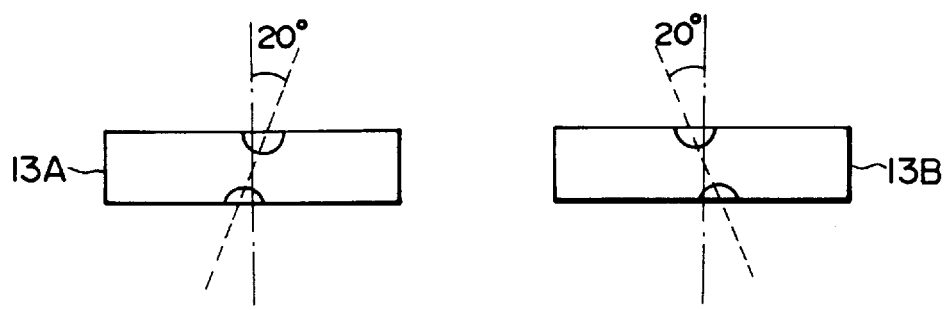
FIG. 9 is a typical view that illustrates the azimuth of a magnetic head.
Figure 10:
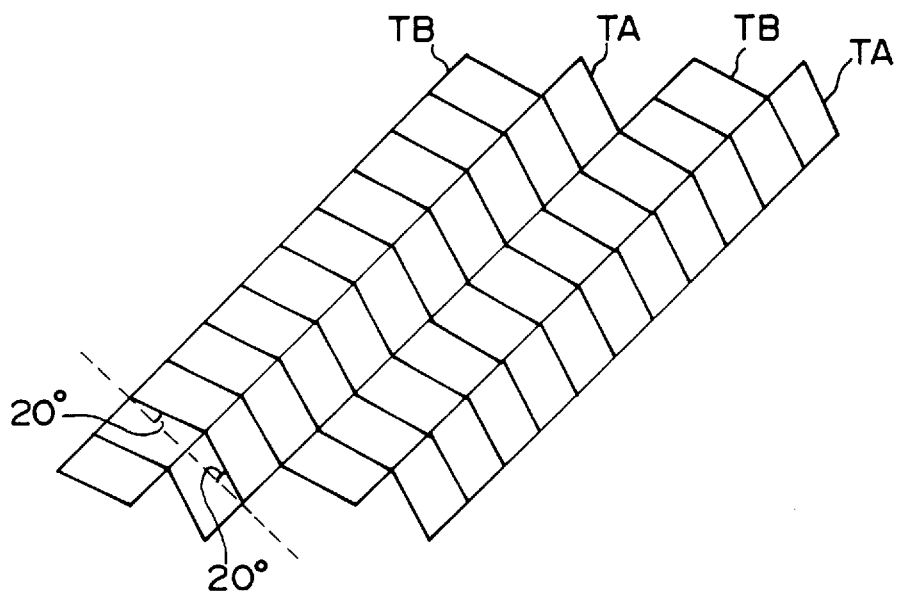
FIG. 10 is a typical view that illustrates a recording pattern recorded by a magnetic head having an azimuth.

The magnetic heads 13A and 13B are mounted individually on a rotary drum 76 respectively at diametrically opposite positions as shown in FIG. 8A or the magnetic heads 13A and 13B are combined in a magnetic head unit and the magnetic head unit is mounted on the rotary drum 76 as shown in FIG. 8B. A magnetic tape, not shown, is wound around the rotary drum 76 at a contact angle of about 180°. When the magnetic heads 13A and 13B are arranged as shown in FIG. 8A, the magnetic heads 13A and 13B come into contact alternately with the magnetic tape. When the magnetic heads 13A and 13B are arranged as shown in FIG. 8B, the magnetic heads 13A and 13B scan the magnetic tape simultaneously. The respective gaps of the magnetic heads 13A and 13B are inclined respectively in opposite directions with respect to the direction of the recording track. For example, the respective azimuth angles of the magnetic heads 13A and 13B are +20° and −20° as shown in FIG. 9 and, consequently, recording patterns as shown in FIG. 10 are formed on the magnetic tape. As is obvious from FIG. 10, the adjacent tracks TA and TB formed on the magnetic tape are formed respectively by the magnetic heads 13A and 13B, which differ from each other in azimuth angle. The arrangement of the tracks TA and TB as shown in FIG. 10 reduces crosstalk between the adjacent tracks due to azimuth loss in reproducing recorded data.

FIGS. 11A and 11B shows more concretely the construction of a double azimuth magnetic recording/reproducing head constructed by mounting the magnetic heads 13A and 13B in combination in a magnetic head unit on a rotary upper drum 76. The upper drum is supported on a fixed lower drum 77 for rotation, for example, at 150 rps (NTSC system). Data representing one field is recorded on five tracks of a magnetic tape 78. This segment system shortens the length of tracks and reduces errors attributable to the linearity of tracks. For example, the contact angle of the magnetic tape 78 is 166° and the diameter of the drums 76 and 77 is 16.5 mm.

The double azimuth magnetic recording/reproducing head, as compared with the magnetic recording/reproducing head provided with a pair of magnetic heads disposed in a diametrically opposite arrangement, is capable of reducing errors attributable to the inferior linearity of tracks. Errors attributable to the inferior linearity of tracks occur due to the vibration of the magnetic tape 78 caused by the eccentric rotation of the upper drum 76. Concretely, the magnetic tape 78 is urged downward as shown in FIG. 12A or the same is urged upward as shown in FIG. 12B to cause the magnetic tape 78 to vibrate and thereby the linearity of tracks is reduced. The double azimuth magnetic recording/reproducing head provided with the magnetic heads 13A and 13B for simultaneous recording, as compared with the magnetic recording/reproducing head provided with the magnetic heads 13A and 13B in a diametrically opposite arrangement, is capable of reducing errors attributable to the inferior linearity of tracks. The small distance between the magnetic heads 13A and 13B enables further accurate adjustment of pairing, which reduces errors attributable to the inferior linearity of tracks.

MAGNETIC RECORDING MEDIUM

Figure 19:
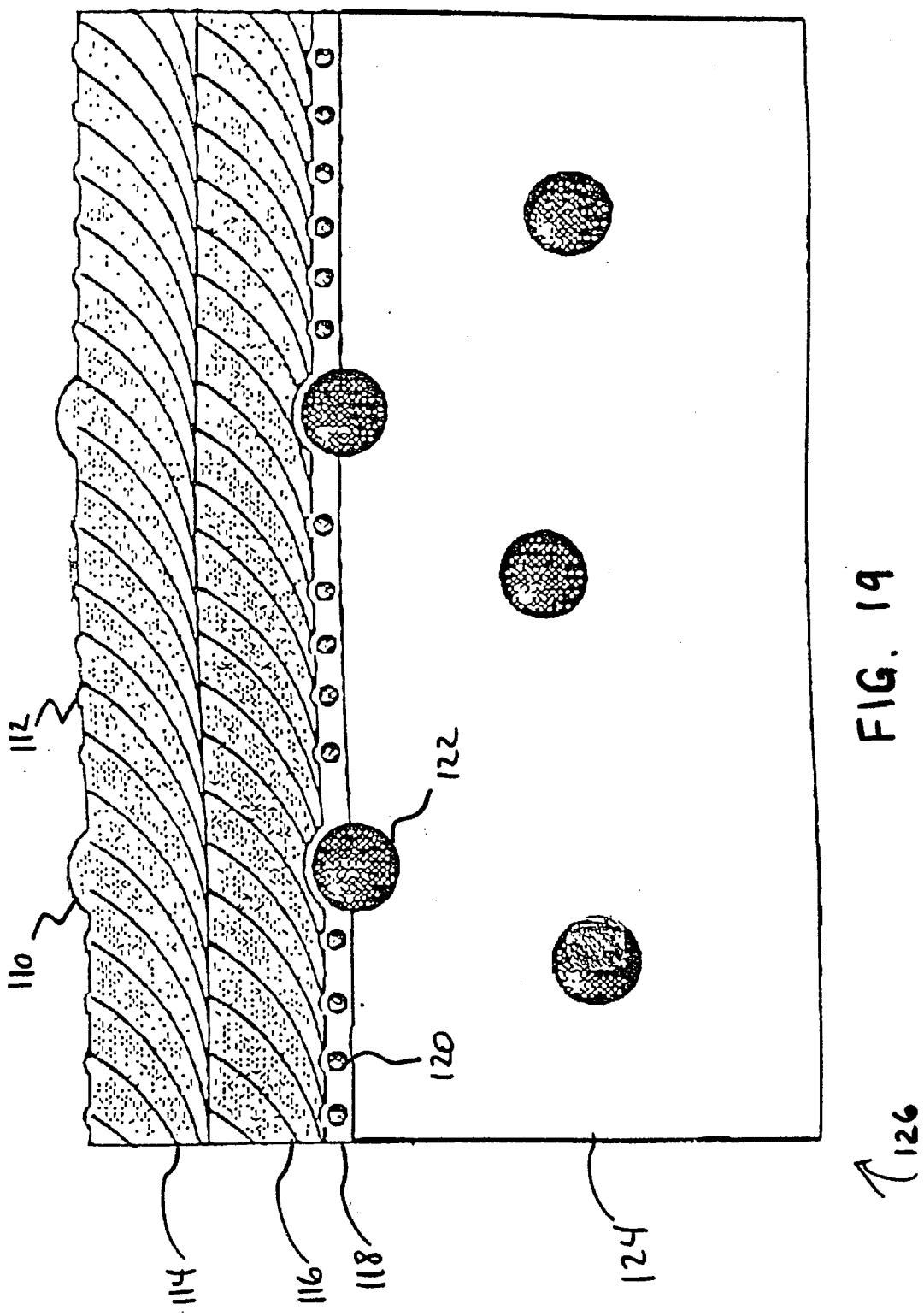
FIG. 19 is a diagram of a cross-section of a magnetic tape.

The digital VTR thus constructed is used for the magnetic recording of data on a magnetic recording medium having a magnetic layer formed of a magnetic metal thin film. The surface design and magnetic characteristics of a magnetic recording medium employed in this embodiment will be described in terms of energy product and the squareness ratio of coercive force which affect the CN ratio and bit error rate in connection with FIG. 19.

Squareness S* of coercive Force and Energy Product

First, a method of fabricating a magnetic tape 126 having a magnetic layer formed of a magnetic metal thin film will be described.

A major surface of a base film 124 of 10 μm in thickness formed of polyethylene terephthalate (PET) was coated with an emulsion containing acrylic ester latex as a principal component to form minute protrusions of the acrylic ester latex particles 120. The base film thus coated with the acrylic ester latex had a center line average roughness Ra of 0.0015 μm and the density of the minute protrusions was about 5 million protrusions per square millimeter.

Figure 13:
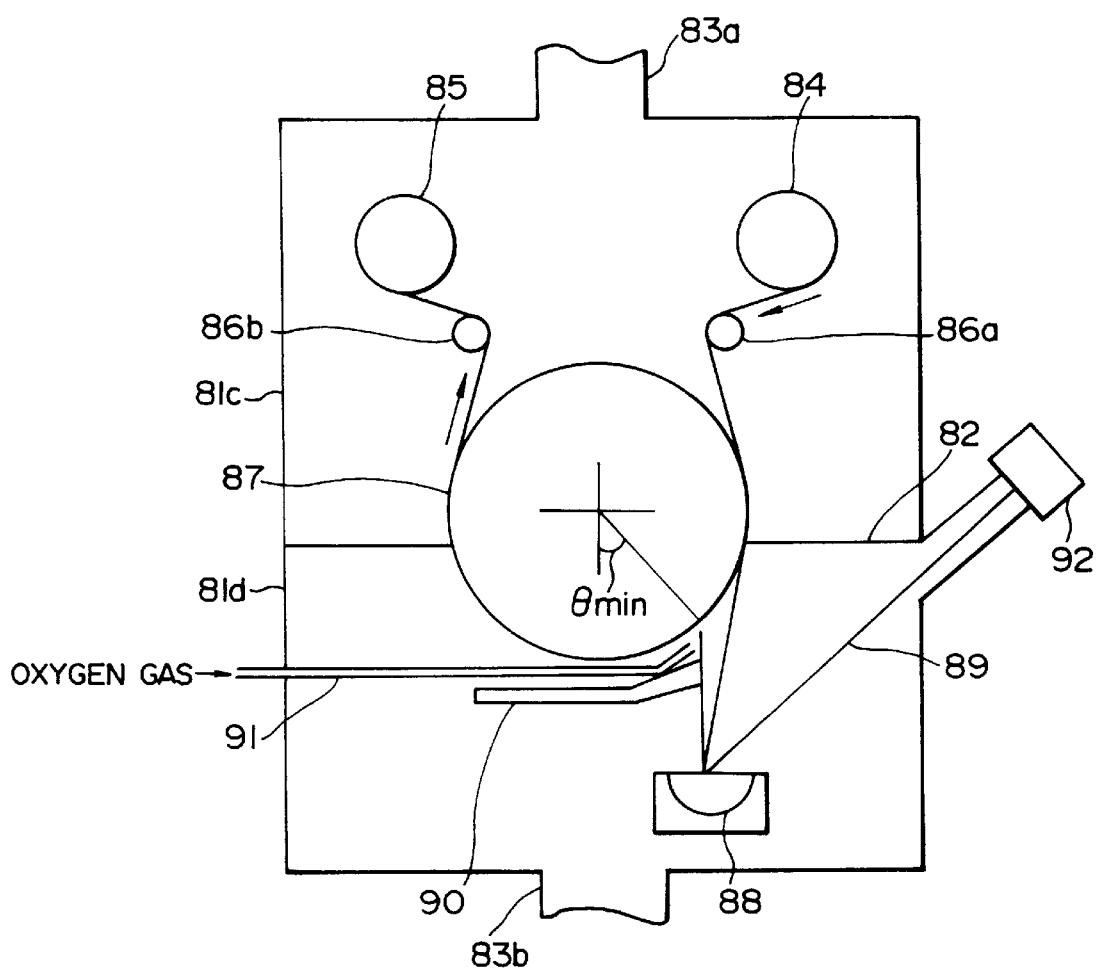
FIG. 13 is a typical view of a vacuum evaporation apparatus.

A magnetic metal thin film was deposited on the base film in an oxygen atmosphere by an oblique evaporation by a vacuum evaporation apparatus as shown in FIG. 13.

As shown in FIG. 13, the vacuum evaporation apparatus has a cooling cylinder 87, and vacuum chambers 81c and 81d partitioned by a partition plate 82. The vacuum chambers 81c and 81d are connected respectively to evacuating systems 83a and 83b. A feed roll 84 for feeding the base film B and a take-up roller 85 for taking up the base film B are disposed in the vacuum chambers 81c. The base film B is guided by guide rollers 86a and 86b so as to travel along the circumference of the cooling cylinder 87. An evaporation source 88 is disposed opposite to the cooling cylinder 87 in the vacuum chamber 81d. A screening plate 90 for determining the incidence angle of the evaporated magnetic metal on the surface of the base film B, and an oxygen supply pipe 91 are arranged near the cooling cylinder 87. The evaporation source 88 may be any suitable material, for example, an elementary metal, such as Fe, Co or Ni, a CoNi alloy or a mixture of elements, provided that the material is capable of forming a thin film having an energy product and coercivity squareness required by the present invention.

The evaporation source 88 is heated and evaporated by electron beams 89 projected by an electron gun 92 while the base film B runs along the circumference of the cooling cylinder 87 to form a magnetic metal thin film on the surface of the base film B by evaporation.

In this embodiment, the evaporation source 88 is Co or a CoNi alloy, the vacuum chambers 81c and 81d are evacuated to a vacuum of $1\times10^{-4}$ torr, oxygen gas is supplied at 250 cm$^3$/min and the screening plate 90 is adjusted so that the evaporated metal falls on the base film B at an incidence angle in the range of 45° to 90°.

Various magnetic tapes of 8 mm in width differing from each other in terms of the thickness δ, and the composition and construction (single-layer construction and two-layer construction) of the magnetic layer were fabricated by the vacuum evaporation apparatus. The magnetic tape 126 having a magnetic layer of two-layer construction, illustrated in FIG. 19, was fabricated by successively forming a first magnetic metal thin film 116 and a second magnetic metal thin film 114 by the same magnetic metal thin film forming process. A magnetic layer of a so-called sequential two-layer construction is formed when the base film B is rewound on the feed roller 84 after forming the first magnetic metal thin film and fed again to form the second magnetic metal thin film. A magnetic layer of a so-called inverse two-layer construction is formed when the base film taken up on the take-up roller 85 is fed to form the second magnetic metal thin film.

The magnetic characteristics including remanent magnetic flux density Br, coercive force Hc, energy product Br.δ.Hc and coercivity squareness S* of the magnetic tapes were measured, and CN ratio and bit error rate were measured by recording and reproducing data by the digital VTR. Measured results are shown in Table 1.

Figure 14:
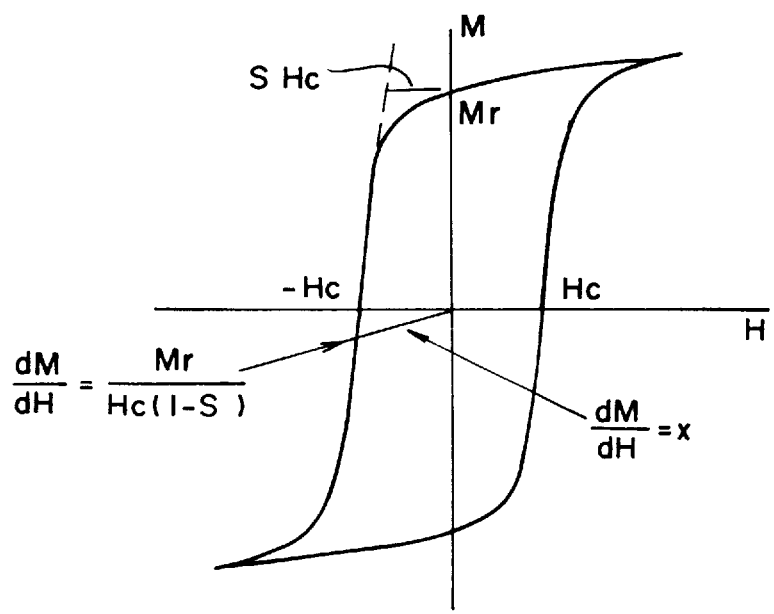
FIG. 14 is a graph showing an M-H loop that illustrates coercivity squareness S*.

Coercivity squareness S* is the gradient of a tangent to an M-H curve shown in FIG. 14 at a point M (Hc)=0. Coercivity squareness S* can readily be determined by using an expression:

$$dM/dH = Mr/Hc(1-S^*) \tag{1}$$

Coercivity squareness S* is one of the parameters of switching field distribution and is a parameter suitable for representing magnetic orientation and inversion of magnetization.

In recording and reproducing data by the digital VTR, CN ratio must be 50 dB or above to limit the deterioration of picture quality to an allowable level, and error rate before correction must be $1\times10^{-4}$ or below to enable effective correction by using an error correction code of a redundancy on the order of 20%. As is obvious from Table 1, energy product Br.δ.Hc and coercivity squareness S* are important factors from such a viewpoint and those factors must meet the requirements of the present invention.

SURFACE PROPERTIES

As mentioned above and illustrated in FIG. 19, the underlayer 118 having minute protrusions of particles of acrylic ester latex 120 was formed on the PET base film 124 of 10 μm in thickness by applying the emulsion containing the acrylic ester latex as a principal component to the base film 124 and drying the acrylic ester latex film, before forming the magnetic metal thin film by depositing a ferromagnetic metal by vacuum evaporation, to adjust the surface properties of the magnetic metal thin film, and a filler 122, such as $SiO_2$, $TiO_2$ or $Al_2O_3$, was added to the base film 124 to form relatively large protrusions in the surface of the base film. Magnetic tapes differing from each other in surface roughness and the height of the protrusions were fabricated by using acrylic ester latex emulsions differing from each other in the particle size of the acrylic ester latex contained in the emulsion and the content of acrylic ester latex and by using base films differing from each other in the content and particle size of the filler.

Magnetic layers differing from each other in magnetic characteristics including energy product were formed by depositing the ferromagnetic metal in different vacuum evaporation processes.

FIRST VACUUM EVAPORATION PROCESS

Figure 15:
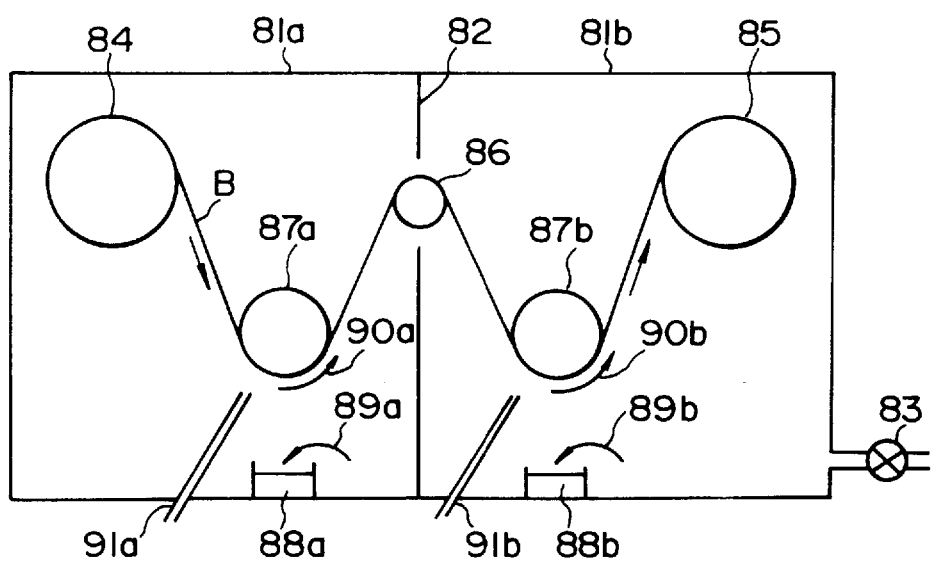
FIG. 15 is a typical view of another vacuum evaporation apparatus.

A two-chamber vacuum evaporation apparatus as shown in FIG. 15 was used and a magnetic layer of a two-layer construction was formed by successively forming two layers of Co-rich magnetic metal thin films by oblique evaporation.

As shown in FIG. 15, the two-chamber vacuum evaporation apparatus has two vacuum chambers 81a and 81b partitioned by a partition plate 82. The vacuum chamber 81b is connected through a valve 83 to an evacuating system. A tape feed roller 84 for feeding a base film is disposed in the vacuum chamber 81a, a tape take-up roller 85 for taking up the base film is disposed in the vacuum chamber 81b, and a guide roller 86 is disposed on the boundary between the vacuum chambers 81a and 81b. The vacuum chambers 81a and 81b are provided with cooling cylinders 87a and 87b, Co evaporation sources 88a and 88b, electron beam projecting devices, not shown, screening plates 90a and 90b for determining incidence angles of evaporated metal on the base film and oxygen gas supply pipes 91a and 91b, respectively.

The base film unwound from the tape feed roller 84 travels via the cooling cylinder 87a, the guide roller 86 and the cooling cylinder 87b in that order and is taken up on the tape take-up roller 85. A magnetic layer consisting of two Co films is formed on the base film by oblique evaporation in the presence of oxygen while the base film moves along the circumferences of the cooling cylinders 87a and 87b.

During vacuum evaporation, the vacuum chambers 87a and 87b were maintained at a vacuum of $1 \times 10^{-4}$ torr and oxygen gas was supplied to the vacuum chambers 87a and 87b at a flow rate of 250 cm$^3$/min. The incidence angle of the evaporated metal on the base film was in the range of 45° to 90°. After forming the magnetic layer consisting of the two Co films, the back surface of the base film was coated with a back coat of a mixture of carbon and an epoxy binder and the surface of the magnetic layer was coated with a lubricating top coat of perfluoropolyether. Then, the base film thus coated with the magnetic layer, the back coat and the top coat was cut into 8 mm wide sample magnetic tapes.

SECOND VACUUM EVAPORATION PROCESS

The same vacuum evaporation apparatus shown in FIG. 15 was used and a magnetic layer consisting of two CoNi alloy layers was formed on the same base film by oblique evaporation under the same process conditions as those for the first vacuum evaporation process, except that the oxygen gas supply rate was 230 cm$^3$/min. Then, the base film was cut into 8 mm wide sample magnetic tapes.

THIRD VACUUM EVAPORATION PROCESS

The vacuum evaporation apparatus as shown in FIG. 13 was used and magnetic tapes having a magnetic layer formed of a single Co layer were fabricated. During vacuum evaporation, the vacuum chambers 87c and 87d were maintained at a vacuum of $1 \times 10^{-4}$ torr and oxygen gas was supplied into the vacuum chambers 87c and 87d at a supply rate of 250 cm$^3$/min. The incidence angle of evaporated metal on the base film was in the range of 45° to 90°. The base film was cut into 8 mm wide sample magnetic tapes.

FOURTH VACUUM EVAPORATION PROCESS

The vacuum evaporation apparatus shown in FIG. 13 was used and a magnetic layer formed of a CoNi alloy layer was formed on the base film by oblique evaporation under the same process conditions as those for the third vacuum evaporation process, except that the oxygen supply rate was 220 cm$^3$/min. Then, the base film was cut into 8 mm wide sample magnetic tapes.

Thus, the oxygen supply rate and the thickness of the magnetic layers were changed to fabricate the magnetic tapes differing from each other in magnetic characteristics (energy product) and surface roughnesses Ra and Rz.

Digital video signals were recorded on the sample magnetic tapes and the level-down (LD) of the reproduced output and bit error rate after level-down were measured. The surface roughness of the sample magnetic tapes were measured under the following conditions specified in JIS B0601.

Measuring instrument: TALYSTEP (Rank Taylor Hobson Limited)
Needle Size: 0.2 µm×0.2 µm (square needle)
Needle Pressure: 2 mg
High-pass filter: 0.33 Hz The LD of digital luminance signal Y that appears at the output terminal 26Y (FIG. 2) was measured. The level of recording signal corresponding to the level of reproducing signal was recorded for about one minute by a pen recorder when the sample magnetic tape is in the initial state. A digital video signal was recorded for two hours and the digital video signal was reproduced for two hours to measure the level of the recording signal corresponding to the level of the reproducing signal after the sample magnetic tape had been driven for four hours. The LD is the difference in the level of recording signal corresponding to the level of the reproduced signal between the initial state of the sample magnetic tape and a state of the same after the same has been driven for four hours. Track width was 5 µm and recording wavelength was 0.5 µm.

Figure 16:
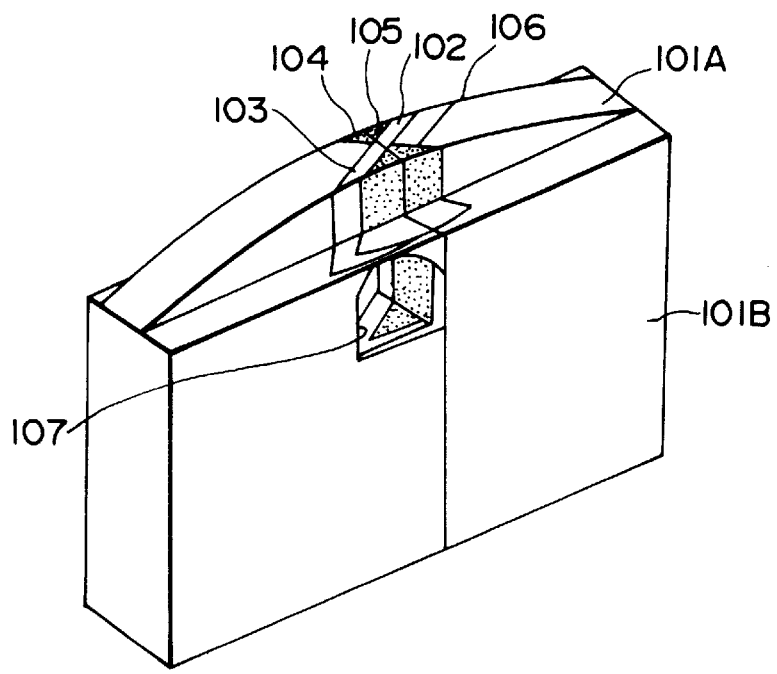
FIG. 16 is a perspective view of a recording/reproducing magnetic head.

A magnetic head shown in FIG. 16 was used for measuring LD and bit error rate. This magnetic head has a magnetic head gap 104 between Fe-Ga-Si-Ru soft magnetic layers 102 and 103 formed on single crystal Mn-Zn ferrite cores 101A and 101B by sputtering. Spaces on the opposite sides of the magnetic head gap 104 with respect to the direction of width of tracks are filled up with glass 105 and 106 to determine the track width. A coil hole 107 is formed in one of the magnetic cores and a recording coil, not shown, is provided in the coil hole 107. The effective gap length of the magnetic head is 0.20 µm. Since the magnetic head is provided in the vicinity of the magnetic head gap 104 with the Fe-Ga-Si-Ru soft magnetic layers 102 and 103 having a saturation magnetic flux density Bs of 14.5 kG, the magnetic head is capable of recording signals on a magnetic tape having a relatively high coercive force without reaching magnetic saturation.

Measured values of center line average surface roughness Ra, ten-point average surface roughness Rz, energy product, LD and bit error rate after level-down of the sample magnetic tapes are shown in Table 2. The magnetic characteristics, the composition and thickness of the magnetic layers of the sample magnetic tapes are shown in Table 3.

As is obvious from Table 2, the LDs of the sample magnetic tapes Nos. 11 to 17 meeting conditions: Ra$\leq$30 Å, Rz$\leq$400 Å and energy product $\geq$75 G.cm.Oe are relatively small and the bit error rates after level-down of the same sample magnetic tapes are on the order of $10^{-5}$. The bit error rates after level-down of the sample magnetic tapes Nos. 19 and 20 having relatively large Ra and Rz are on the order of $10^{-4}$. The bit error rate of the sample magnetic tape No. 18 having Ra, Rz and energy product meeting the conditions required by the present invention and a coercivity squareness S* slightly smaller than 0.3 is relatively large. The bit error rate of the sample magnetic tape No. 21 having Rz exceeding 400 Å, a relatively small energy product and a coercivity squareness S* smaller than 0.3 is a very large value on the order of $10^{-3}$.

Although it is expected that bit error rate can be decreased by decreasing center line surface roughness Ra, it is difficult to decrease center line surface roughness Ra to a value below about 8 Å and to decrease ten-point surface roughness Rz to a value below about 50 Å.

Figure 17:
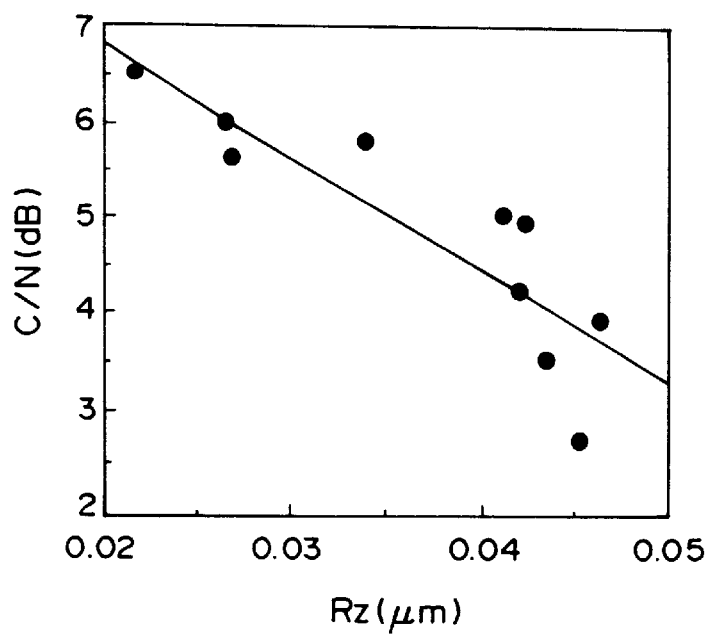
FIG. 17 is a graph showing the dependence of CN ratio on Rz when $\lambda=0.5$ $\mu$m.
Figure 18:
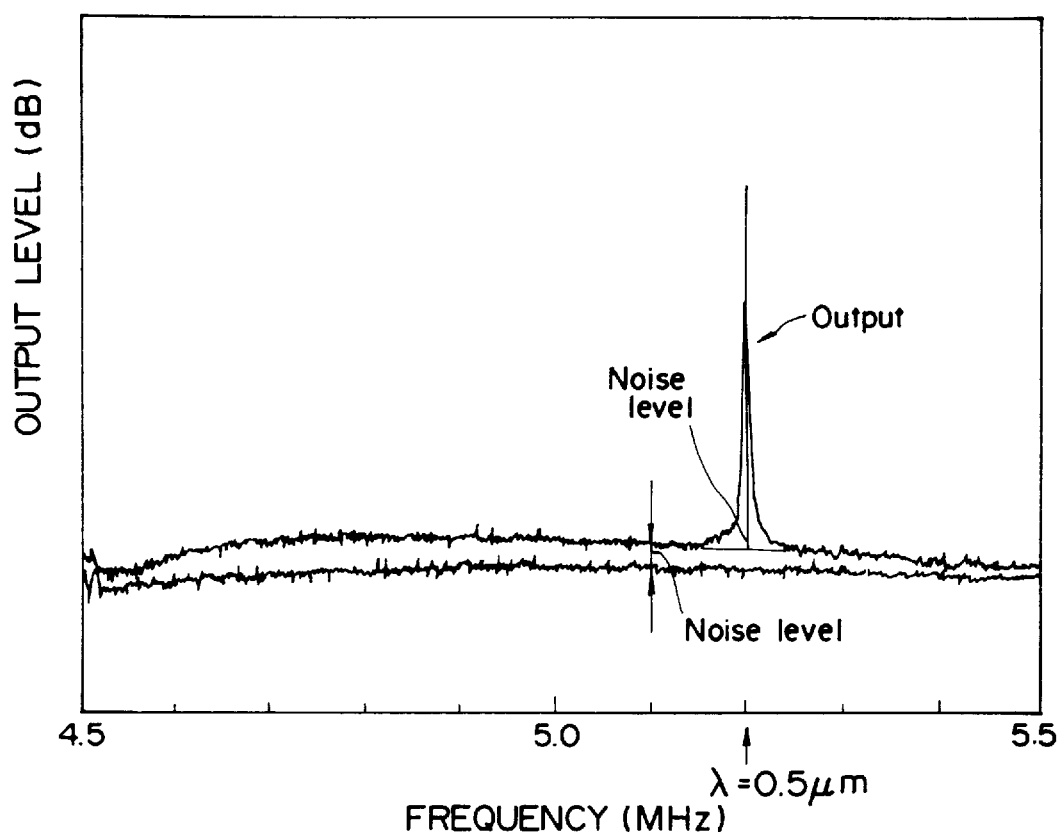
FIG. 18 is a graph that illustrates CN ratio.

FIG. 17 shows the dependence of CN ratio (carrier-to-noise ratio) for a recording wavelength λ=0.5 µm on Rz. CN ratio is the difference of the output level and the noise at the recording wavelength λ=0.5 µm (FIG. 18). The relative running speed Vr, i.e., the running speed of the magnetic tape relative to the magnetic head, is 3.8 m/sec. CN ratio was measured by the spectrum analyzer of the Hewlett-Packard Co. It is known from FIG. 17, CN ratio decreases with the increase of Rz and CN ratio is not smaller than 4 dB when Rz$\leq$400 Å.

The dependence of the LD of the reproduced output and bit error rate after level-down on the height of protrusions determined by selectively determining the particle size of the filler added to the base film and the material of the under layer was examined. Although the height of the protrusions may be measured by TALYSTEP, a scanning tunnel microscope (Nasoscope II, Digital Instrument Co.) was used for measuring the height of the protrusions to measure the height at a higher resolution. The height of the protrusions was measured at 400 sample points (one scanning cycle) in a plurality of square areas of 10 $\mu$m×10 $\mu$m. The heights of the protrusions are represented by the average of heights measured at ten sample points. An interatomic force microscope (AFM) may be used for measuring the height of the protrusions instead of the scanning tunnel microscope.

Measured data of the heights $h_f$ and $h_u$ of the protrusions 110 and 112, respectively, on the sample magnetic tapes, the density of the protrusions, the difference between the heights $h_f$ and $h_u$, center line average surface roughness Ra, energy product, LD and bit error rate after level-down are shown in Table 4. The magnetic characteristics of the sample magnetic tapes, and the composition and thickness of the magnetic layers of the sample magnetic tapes are shown in Table 5.

As is obvious from Table 4, the sample magnetic tapes Nos. 22 to 29 meeting conditions: $h_f \leq 400$ Å and $h_u \leq 200$ Å have small LDs and very small bit error rates after level-down. The largest bit error rate after level-down among those of the sample magnetic tapes Nos. 22 to 29 is as small as 1×10$^{-4}$. The sample magnetic tapes Nos. 22 to 29 meet also conditions: $h_f - h_u \leq 300$ Å, Ra $\leq 30$ Å and energy product $\geq 75$ G.cm.Oe.

The sample magnetic tape No. 34 to 37 not meeting both or either of conditions: $h_f \leq 400$ Å and $h_u \leq 200$ Å have relatively large LDs and bit error rates after level-down on the order of 10$^{-3}$, which is relatively large. The sample magnetic tape No. 36 and 37, which has an energy product lower than 75 G.cm.Oe and coercivity squareness S* lower than 0.3, in particular, has a very large bit error rate after level-down.

Incidentally, still picture reproduction endurance time of a magnetic tape must practically be not less than thirty minutes. According to the results of experiments conducted by the inventors of the present invention, the density of the projections 112 formed on the surface of the magnetic layer by the under layer 118 and having a height $h_u$ of 200 Å or below must be two million projections per square millimeter to provide a magnetic tape having a still picture reproduction endurance time of thirty minutes or longer. The still picture reproduction endurance time of a magnetic tape increases with the increase of the density of the projections 112 until the density of the projections 112 reaches twenty-four million projections per square millimeter, and then the still picture reproduction endurance time decreases and bit error rate increases with the increase of the density of the projections 112 beyond twenty-four million projections per square millimeter. Accordingly, twenty-four million projections per square millimeter is the upper limit of the density of the projections 112. From the viewpoint of still picture reproduction endurance time, the density of the projections 112 formed in the surface of the magnetic layer by the under layer 118 and having a higher $h_u$ not greater than 200 Å must be in the range of two million to twenty-four million projections per square millimeter. Although this tendency is not affected by the change of the height $h_u$, the allowable density range changes slightly; for example, the upper limit of the allowable density range increases with the decrease of the height $h_u$ of the projections 112.

Preferably, the density of the projections 110 formed by the filler 122 is 5×10$^4$ projections per square millimeter or less. An excessively large density of the projections 110 formed by the filler 122 causes large level-down and increases bit error rate. Although there are no particular restrictions on the lower limits to the height $h_f$ of the protrusions 110 formed by the filler 122 and the height $h_u$ of the protrusions 112 formed by the under layer 118, it is preferable, in view of the smooth running of the magnetic tape, that the lower limits are 40 Å or above.

Although the sample magnetic tape No. 31 meets the conditions: $h_f \leq 400$ Å and $h_u \leq 200$ Å, the still picture reproduction endurance time of the same magnetic tape is on the order of only fifteen minutes because the density of the protrusions formed by the under layer is one million protrusions per square millimeter. On the other hand, although the sample magnetic tape No. 32 has a sufficiently long still picture reproduction endurance time of 150 minutes because the density of the protrusions is as large as twenty-five million protrusions per square millimeter, the bit error rate of the same sample magnetic tape is as large as 8.9×10$^{-3}$. Although the sample magnetic tape No. 30 is satisfactory in LD and bit error rate, the still picture reproduction endurance time is not long enough.

Although the sample magnetic tape No. 33 meets the conditions: $h_f \leq 400$ Å and $h_u \leq 200$ Å, the bit error rate is as large as 8.5×10$^{-3}$ because the density of the filler added to the base film is as large as sixty thousand pieces per square millimeter, which is due principally to its large LD.

The still picture reproduction endurance time of a magnetic tape not included in the sample magnetic tapes and not meeting the condition: $h_f - h_u \leq 300$ Å, for example, $h_f = 350$ Å and $h_u = 0$ (no under layer) was about ten minutes and the bit error rate of the same magnetic tape was 2.5×10$^{-5}$. This magnetic tape has a density of the protrusions formed by the filler added to the base film of thirty thousand protrusions per square millimeter, a center line average surface roughness Ra of 12 Å and an energy product of 140 G.cm.Oe.

The respective bit error rates of the sample magnetic tape No. 36 having protrusions of a large height and a small energy product and the sample magnetic tape No. 37 having a small energy product and a small coercivity squareness were very large.

The use of such a ME tape (metal evaporation tape) for recording signals of the shortest wavelength of 0.5 $\mu$m on tracks of 5 $\mu$m in track width enables recording at a high density of 1.25 $\mu$m$^2$/bit or below. However, reduction in the wavelength of recording signals and reduction in track width, in general, reduces the CN ratio of the reproduced output. For example, when signals were recorded and the recorded signals were reproduced by a digital VTR having a track pitch of 15 $\mu$m and the shortest wavelength of 0.5 $\mu$m by rotating the rotary drum of 40 mm in diameter of the digital VTR at a rotating speed of 80 rpm, the CN ratio for recording wavelength of 1 $\mu$m was 51 dB and the bit error rate was 4×10$^{-5}$. If the track width is 5 $\mu$m, the CN ratio is only 44 dB and hence picture quality is deteriorated. Accordingly, the present invention employs the foregoing magnetic tape to compensate the CN ratio reduction of 7 dB.

As is generally known, increase in spacing loss during reproduction causes signal output level to fall, and spacing loss is dependent on the flatness of the magnetic tape. The flatness of a coated magnetic tape is dependent on the condition of the material coating the base film and the flatness of a ME tape is dependent on the flatness of the base film. The foregoing experiments proved that the reduction of the surface roughness of the base film to the greatest possible extent increases CN ratio by 1 dB and the use of the magnetic tape meeting the requirements of the present invention on the digital VTR having a track pitch of 15 μm and the shortest wavelength of 0.5 μm improves CN ratio by 3 dB. Accordingly, the use of the magnetic tape meeting the requirements of the present invention improves CN ratio by 4 dB.

Since the magnetic recording method in accordance with the present invention employs the Viterbi decoding circuit for channel-decoding, CN ratio was improved by 3 dB in decoding each bit by the foregoing digital VTR.

Thus, the reduction of 7 dB in CN ratio can be compensated and the bit error rate in signals recorded at a density of 1.25 μm$^2$/bit is substantially equal to that in recording signals by the foregoing digital VTR.

Bit error rate before correction must be $10^{-4}$ or below to limit bit error rate to a value which can be corrected by using an error correction code of a redundancy on the order or 20%.

As is apparent from the foregoing description, the magnetic recording method in accordance with the present invention is capable of increasing CN ratio and of reducing bit error rate even if signals are recorded at a high density of 1 μm$^2$/bit. Furthermore, since the magnetic heads are not abraded locally and no space is formed between the magnetic recording medium and the magnetic head, the level-down of the level of output signals obtained by reproducing signals recorded on the magnetic recording medium can be suppressed and the electromagnetic conversion characteristics can be improved.

Although the invention has been described in its preferred form with a certain degree of particularity, obviously many changes and variations are possible therein. It is therefore to be understood that the present invention may be practiced otherwise than as specifically described herein without departing from the scope and spirit thereof.

TABLE 1

| | Magnetic Layer | | Br | Hc | | | | C/N | Bit error |
|---|---|---|---|---|---|---|---|---|---|
| | Construction | Composition | (G) | (Oe) | δ(Å) | Br · δ · Hc | S* | (dB) | rate |
| Sample 1 | Single-layer | Co$_{100}$ | 4800 | 1080 | 1500 | 77 | 0.31 | 50.2 | 8.8 × 10$^{-5}$ |
| Sample 2 | Sequential two-layer | Co$_{100}$ | 4100 | 1680 | 2000 | 138 | 0.46 | 53.6 | 1.5 × 10$^{-5}$ |
| Sample 3 | Single-layer | Co$_{90}$Ni$_{10}$ | 350 | 1100 | 2000 | 77 | 0.33 | 50.1 | 8.1 × 10$^{-5}$ |
| Sample 4 | " | Co$_{95}$Ni$_5$ | 3610 | 1080 | 2000 | 78 | 0.32 | 50.3 | 8.7 × 10$^{-5}$ |
| Sample 5 | Inverted two-layer | Co$_{100}$ | 4230 | 1470 | 1800 | 112 | 0.43 | 52.5 | 5.7 × 10$^{-5}$ |
| Sample 6 | Inverted two-layer | Co$_{100}$ | 4380 | 1400 | 2400 | 147 | 0.39 | 52.1 | 1.3 × 10$^{-5}$ |
| Sample 7 | Single-layer | Co$_{80}$Ni$_{20}$ | 3300 | 1050 | 2000 | 69 | 0.25 | 48.0 | 3.0 × 10$^{-4}$ |
| Sample 8 | " | Co$_{100}$ | 6000 | 1030 | 500 | 31 | 0.58 | 47.3 | 2.3 × 10$^{-3}$ |
| Sample 9 | " | Co$_{100}$ | 5400 | 1070 | 1000 | 57 | 0.41 | 48.4 | 2.5 × 10$^{-4}$ |
| Sample 10 | " | Co$_{100}$ | 3950 | 1020 | 2500 | 101 | 0.19 | 48.7 | 1.8 × 10$^{-4}$ |

TABLE 2

| | Ra(Å) | Rz(Å) | Energy Product (G · cm · Oe) | LD(dB) | Bit Error Rate After Level-Down |
|---|---|---|---|---|---|
| Sample 11 | 29 | 290 | 138 | −1 | 4.8 × 10$^{-5}$ |
| Sample 12 | 26 | 295 | 102 | −1.2 | 7.9 × 10$^{-5}$ |
| Sample 13 | 28 | 288 | 85 | −0.9 | 8.4 × 10$^{-5}$ |
| Sample 14 | 18 | 220 | 141 | −0.5 | 3.5 × 10$^{-5}$ |
| Sample 15 | 8 | 180 | 140 | −0.4 | 1.3 × 10$^{-5}$ |
| Sample 16 | 11 | 100 | 135 | −0.4 | 1.9 × 10$^{-5}$ |
| Sample 17 | 32 | 360 | 115 | −1.2 | 9.6 × 10$^{-5}$ |
| Sample 18 | 20 | 210 | 118 | −0.6 | 3.1 × 10$^{-5}$ |
| Sample 19 | 45 | 450 | 130 | −3.0 | 1.1 × 10$^{-4}$ |
| Sample 20 | 36 | 409 | 135 | −2.0 | 2.3 × 10$^{-4}$ |
| Sample 21 | 36 | 407 | 72 | −2.4 | 3.0 × 10$^{-3}$ |

TABLE 3

| | Magnetic Layer | | Br | Hc | δ | | |
|---|---|---|---|---|---|---|---|
| | Construction | Composition | (G) | (Oe) | (μm) | Br · δ · Hc | S* |
| Sample 11 | Two-layer | $Co_{95}Ni_5$ | 4180 | 165 | 0.20 | 138 | 0.48 |
| Sample 12 | " | $Co_{80}Ni_{20}$ | 4080 | 1250 | 0.20 | 102 | 0.45 |
| Sample 13 | " | $Co_{80}Ni_{20}$ | 3870 | 1220 | 0.18 | 85 | 0.47 |
| Sample 14 | " | $Co_{95}Ni_5$ | 4200 | 1680 | 0.20 | 141 | 0.47 |
| Sample 15 | " | $Co_{100}$ | 4520 | 1550 | 0.20 | 140 | 0.32 |
| Sample 16 | " | $Co_{100}$ | 4600 | 1630 | 0.18 | 135 | 0.48 |
| Sample 17 | " | $Co_{90}Ni_{10}$ | 4260 | 1350 | 0.20 | 115 | 0.47 |
| Sample 18 | Single-layer | $Co_{90}Ni_{10}$ | 4200 | 1400 | 0.20 | 118 | 0.27 |
| Sample 19 | " | $Co_{95}Ni_5$ | 3990 | 1480 | 0.22 | 130 | 0.27 |
| Sample 20 | " | $Co_{90}Ni_{10}$ | 3700 | 1460 | 0.25 | 135 | 0.26 |

TABLE 4

| | $h_f$(Å)/Dens. (ten thousand/mm²) | $h_u$(Å)/Dens. (ten thousand/mm²) | $h_f - h_u$ (Å) | Ra (Å) | Energy product (G · cm · Oe) | LD(dB) | Bit Error Rate After Level-Down |
|---|---|---|---|---|---|---|---|
| Sample 22 | 200/3 | 110/960 | 90 | 16 | 150 | −0.7 | $8.8 \times 10^{-5}$ |
| Sample 23 | 200/3 | 55/1600 | 145 | 15 | 155 | −0.4 | $4.2 \times 10^{-5}$ |
| Sample 24 | 200/1 | 55/1600 | 145 | 16 | 80 | −0.3 | $9.7 \times 10^{-5}$ |
| Sample 25 | 250/3 | 110/1000 | 140 | 17 | 154 | −0.9 | $7.8 \times 10^{-5}$ |
| Sample 26 | 350/3 | 200/1020 | 150 | 26 | 142 | −.2 | $9.9 \times 10^{-5}$ |
| Sample 27 | 350/2 | 110/980 | 240 | 20 | 151 | −1.6 | $7.9 \times 10^{-5}$ |
| Sample 28 | 350/3 | 55/1200 | 295 | 17 | 160 | −1.8 | $6.5 \times 10^{-5}$ |
| Sample 29 | 350/3 | 55/1200 | 295 | 17 | 98 | −1.6 | $9.8 \times 10^{-5}$ |
| Sample 30 | 350/3 | 200/250 | 150 | 19 | 140 | −0.3 | $2.6 \times 10^{-5}$ |
| Sample 31 | 350/3 | 200/100 | 150 | 18 | 141 | — | |
| Sample 32 | 350/3 | 200/2500 | 150 | 26 | 132 | −2.6 | $8.9 \times 10^{-3}$ |
| Sample 33 | 350/6 | 200/1020 | 150 | 20 | 144 | −3.7 | $8.5 \times 10^{-3}$ |
| Sample 34 | 450/3 | 250/980 | 200 | 41 | 140 | −2.5 | $6.9 \times 10^{-3}$ |
| Sample 35 | 450/3 | 100/1010 | 350 | 33 | 151 | −3.5 | $7.2 \times 10^{-3}$ |
| Sample 36 | 450/3 | 250/980 | 200 | 40 | 73 | −2.7 | $9.8 \times 10^{-3}$ |
| Sample 37 | 450/3 | 100/1010 | 350 | 32 | 72 | −3.9 | $1.5 \times 10^{-3}$ |

TABLE 5

| | Magnetic Layer | | Br | | δ | | |
|---|---|---|---|---|---|---|---|
| | Construction | Composition | (G) | Hc (Oe) | (μm) | Br · δ · Hc | S* |
| Sample 21 | Single-layer | $Co_{80}Ni_{20}$ | 3750 | 960 | 0.20 | 72 | 0.28 |
| Sample 22 | Two-layer | $Co_{100}$ | 4170 | 1800 | 0.20 | 150 | 0.46 |
| Sample 23 | Two-layer | $Co_{100}$ | 4580 | 1410 | 0.24 | 155 | 0.33 |
| Sample 24 | Single-layer | $CO_{80}Ni_{20}$ | 3640 | 1100 | 0.20 | 80 | 0.32 |
| Sample 25 | Single-layer | $Co_{95}Ni_5$ | 4050 | 1520 | 0.25 | 154 | 0.31 |
| Sample 26 | Single-layer | $Co_{90}Ni_{10}$ | 4260 | 1390 | 0.24 | 142 | 0.32 |
| Sample 27 | Single-layer | $Co_{95}Ni_5$ | 4500 | 1600 | 0.21 | 151 | 0.35 |
| Sample 28 | Two-layer | $Co_{90}Ni_{10}$ | 4640 | 1380 | 0.25 | 160 | 0.46 |
| Sample 29 | Single-layer | $Co_{90}Ni_{10}$ | 4580 | 1070 | 0.20 | 98 | 0.33 |
| Sample 30 | Two-layer | $Co_{90}Ni_{10}$ | 5070 | 1380 | 0.20 | 140 | 0.46 |
| Sample 31 | Two-layer | $Co_{90}Ni_{10}$ | 4000 | 1410 | 0.25 | 141 | 0.37 |
| Sample 32 | Single-layer | $Co_{95}Ni_5$ | 3929 | 1530 | 0.22 | 132 | 0.27 |
| Sample 33 | Two-layer | $Co_{95}Ni_5$ | 3450 | 1670 | 0.25 | 144 | 0.38 |
| Sample 34 | Two-layer | $Co_{90}Ni_{10}$ | 4450 | 1430 | 0.22 | 140 | 0.40 |
| Sample 35 | Two-layer | $Co_{90}Ni_{10}$ | 4310 | 1400 | 0.25 | 151 | 0.38 |
| Sample 36 | Single-layer | $Co_{80}Ni_{20}$ | 3860 | 1050 | 0.18 | 73 | 0.32 |
| Sample 37 | Single-layer | $Co_{80}Ni_{20}$ | 3430 | 1050 | 0.20 | 72 | 0.26 |

What is claimed is:

1. A method for magnetically recording digital video signals, comprising the steps of:

separating input digital video signals into data blocks, each composed of a plurality of pixel data;

compression-coding said blocks of pixel data block-by-block;

converting the compression-coded data into channel-encoded data; and supplying the resulting channel-encoded data to magnetic heads on a rotary drum for recording by such heads on a magnetic recording medium that comprises a non-magnetic base carrying thereon a magnetic layer that includes at least one thin magnetic metal film and has an energy product of at least 100 G.cm.Oe, said magnetic recording medium having a surface roughness of less than 0.003 μm in center line average height Ra and at most 0.04 μm in ten point average height Rz, and having a bit error rate of at most $8.4 \times 10^{-5}$.

2. A method for magnetically recording digital video signals, comprising the steps of:

separating input digital video signals into data blocks, each composed of a plurality of pixel data;

compression-coding said blocks of pixel data block-by-block;

converting the compression-coded data into channel-encoded data; and supplying the resulting channel-encoded data to magnetic heads on a rotary drum for recording by such heads on a magnetic recording medium comprising:

a nonmagnetic base including fillers therein for forming a plurality of first protrusions;

an under layer carried on said nonmagnetic base for forming a plurality of second protrusions; and a magnetic layer carried on said under layer, the magnetic layer including at least one thin magnetic metal film and having an energy product of at least 100 G.cm.Oe;

said first protrusions having a height $h_f$ of at most 0.04 $\mu$m and said second protrusions having a height $h_u$ of at most 0.02 $\mu$m, said magnetic recording medium having a bit error rate of at most $1 \times 10^{-4}$.

3. A method according to claim 2, wherein there is a difference ($h_f - h_u$) between the height $h_f$ of the first protrusions and the height $h_u$ of the second protrusions of at most 0.03 $\mu$m.

4. A method for magnetically recording digital video signals, comprising the steps of:

separating input digital video signals into data blocks, each composed of a plurality of pixel data;

compression-coding said blocks of pixel data block-by-block;

converting the compression-coded data into channel-encoded data; and supplying the resulting channel-encoded data to magnetic heads on a rotary drum for recording by such heads on a magnetic recording medium that comprises a nonmagnetic base carrying thereon a magnetic layer that includes at least one thin magnetic metal film and has an energy product of at least 75 G.cm.Oe and a coercivity squareness S* of at least 0.3, said magnetic recording medium having a bit error rate of at most $1 \times 10^{-4}$.

5. A method according to claim 1, wherein the magnetic layer has a coercivity squareness S* of at least 0.3.

6. A method according to claim 2, wherein the magnetic layer has a coercivity squareness S* of at least 0.3.

7. A method according to claim 3, wherein the magnetic layer has a coercivity squareness S* of at least 0.3.

* * * * *